UNITED STATES PATENT OFFICE.

HANS LÜTTKE AND LUDWIG SCHOLVIEN, OF BERLIN, GERMANY, ASSIGNORS TO THE FIRM T. D. RIEDEL, OF SAME PLACE.

SALICYLATE OF PHENYLDIMETHYLPYRAZOLONE.

SPECIFICATION forming part of Letters Patent No. 444,004, dated January 6, 1891.

Application filed August 6, 1890. Serial No. 361,189. (No specimens.)

*To all whom it may concern:*

Be it known that we, HANS LÜTTKE and LUDWIG SCHOLVIEN, of Berlin, German Empire, subjects of the King of Prussia and Emperor of Germany, have invented certain new and useful Improvements in the Manufacture of Salicylate of Phenyldimethylpyrazolone; and we do hereby declare the following to be a full, clear, and exact description of the invention, such as will enable others skilled in the art to which it appertains to make and use the same.

Our invention relates to the manufacture of salicylate of phenyldimethylpyrazolone.

The salts of phenyldimethylpyrazolone have not heretofore been much experimented with for the reason, generally, that they can only be caused to crystallize with difficulty, and therefore they cannot easily be obtained in a pure state.

According to our invention we produce in the following manner, by the application of heat, a salicylate of phenyldimethylpyrazolone which will easily crystallize, viz: We take one hundred parts, by weight, of phenylhydrazine; one hundred and twenty-five parts, by weight, of acetyl acetic ether; one hundred and fifty parts, by weight, of methyl-salicylic ether; twenty parts, by weight, of fifty per cent. hydriodic acid, and one hundred parts, by weight, of methylic alcohol. These ingredients we heat in a digester to from 160° to 180° centigrade (corresponding to nearly nine to fifteen atmospheres) for about ten to twelve hours. The resulting thick brownish mass is then washed with petrolbenzine to separate the residue of methyl-salicylic ether. The methylic alcohol is then separated by distillation and the remaining mass is left to crystallize. The deposited brownish crystallized mass is freed from the adhering liquid particles as far as possible by suction and then washed with benzine-ether and purified by recrystallizing it in alcohol. The body thus formed crystallizes in the form of hexagonal scales, and, as proved by the analysis of the constituting elements, is expressed by the formula $C_{18}H_{18}N_2O_4$. It is easily soluble in spirits of wine, benzole, and acetone, less so in ether, and but slightly soluble in water. The melting-point is constant at about 91.5° centigrade. As a proof that a combination of phenyldimethylpyrazolone and salicylic acid has been obtained by the process, it will be found that when heated with sulphuric acid it yields salicylic acid, or when heated with soda-lye it yields phenyldimethylpyrazolone, having a melting-point of about 113° centigrade.

Forty grams of the combination, produced as before described, when treated with sulphuric acid, yield 1.68 grams, corresponding to forty-two per cent. of salicylic acid, while in theory it should be 42.3 per cent.; and, on the other hand, 4.0 grams of the combination yield 2.28 grams of phenyldimethylpyrazolone when treated in soda-lye, or fifty-seven per cent., which in theory should be 57.7 per cent.

In carrying out our process the action is as follows: Phenylhydrazine ($C_6H_5-NH-NH_2$) and acetyl acetic ether $CH_3CO-CH_2-COO$ $C_2H_5$ (see E. Fischer's *Berichte der Deutschen Chemischen Gesellschaft*, 1883, vol. 16, p. 661) combine at an ordinary temperature and give up water and form $C_6H_5NH-N=C$ $(CH_3)-CH_2-COOC_2H_5$. On the other hand, the methyl-salicylic ether reacts with the free hydriodic acid in the digester, forming salicylic acid and methyliodine somewhat corresponding to the equation

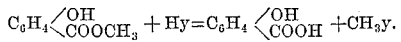

The methyl-iodine acts in *statu nascendi* upon the hereinbefore-mentioned products of condensation of phenylhydrazine and acetyl acetic ether, when by the separation of ethylic alcohol from the said product it becomes methylated, and iodide of hydrogen is formed. The latter can therefore act again and again with the methyl-salicylic ether until the phenyldimethylpyrazolone is completely extracted.

The process may be illustrated by the following equation: $C_6H_5-NH-N=C(CH_3)-$ $CH_2-COOC_2H_5+CH_3y=C_{11}H_{12}ON_2+Hy+C_2$ $H_5OH$. The phenyldimethylpyrazolone thus formed combines in *statu nascendi* with the freed salicylic acid and forms the salt $C_{18}H_{18}$ $N_2O_4=C_{11}H_{12}N_2O-C_7H_6O_3$.

A less quantity of hydriodic acid can be used than that hereinbefore stated, (as we have proved by several operations on a large scale, which bear out the statements hereinbefore made in reference to our process,) although the largest result can be produced with that quantity in a proportionately short space of time. From one kilogram of phenylhydrazine, 1.25 kilogram of acetyl acetic ether, 1.5 kilogram of methyl-salicylic ether, and 0.1 kilogram of fifty per cent. hydriotic acid we have obtained 2.18 kilograms of salicylate of phenyldimethylpyrazolone, or 72.6 per cent. of the theoretical quantity.

We would observe that the above proportions have been found to give satisfactory results; but they can be varied without departing from our invention, as also can the time and the degree of heat. Further, the hydriodic acid which we have found especially suitable for the purpose can be replaced by other halogen acids, such as bromhydric acid.

Where phenyldimethylpyrazolone can be readily obtained, the salicylate of phenyldimethylpyrazolone may also be produced by melting the former by means of heat with salicylic acid and water in the proportions hereinbefore stated.

The salicylate of phenyldimethylpyrazolone possesses considerable antiseptic anodyne and preserving qualities, and is therefore especially applicable for use as a healing medicine, as an antiseptic for technical purposes, and as a preservative.

Having now particularly described and ascertained the nature of the said invention and in what manner the same is to be performed, we declare that what we claim is—

1. The manufacture of salicylate of phenyldimethylpyrazolone by heating (preferably under pressure) phenylhydrazine, acetyl acetic ether, and methyl-salicylic ether in the presence of a haloid hydric acid.

2. As a new product, salicylate of phenyldimethylpyrazolone, which in a pure state crystallizes readily, melts at about 91.5° centigrade, and is soluble in alcohol, benzol, or acetone, but is insoluble in water and yields salicylic acid in the presence of a strong acid, such as sulphuric acid, and phenyldimethylpyrazolone in the presence of soda-lye.

In testimony whereof we affix our signatures in presence of two witnesses.

HANS LÜTTKE.
LUDWIG SCHOLVIEN.

Witnesses:
GEORGE LOUBEIR,
ADOLF DEMCLIUS.